H. BROOME.
Pipe-Joint.
No. 221,442.    Patented Nov. 11, 1879.
Fig. 1.
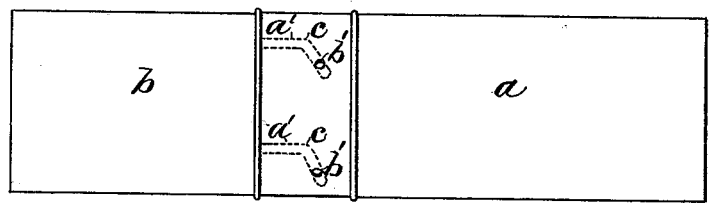
Fig. 2.    Fig. 3.
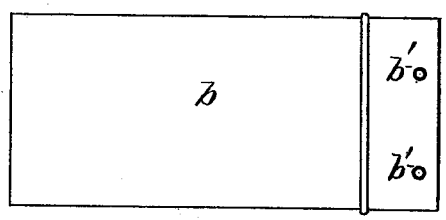    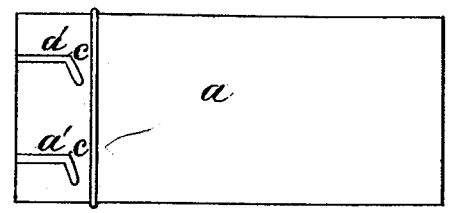
Fig. 4.
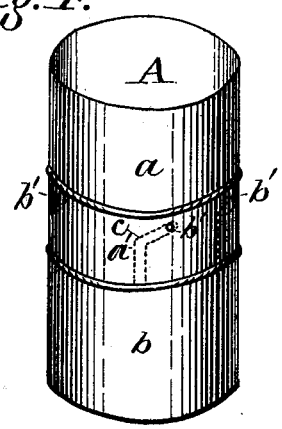
Fig. 5.    Fig. 6.
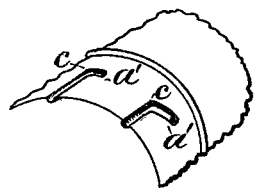    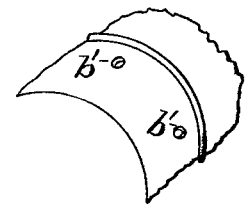
Attest.
W. M. Converse
Ora Converse
Inventor:
Henry Broome,
B. C. Converse Atty.

UNITED STATES PATENT OFFICE.

HENRY BROOME, OF SPRINGFIELD, OHIO.

IMPROVEMENT IN PIPE-JOINTS.

Specification forming part of Letters Patent No. 221,442, dated November 11, 1879; application filed April 4, 1879.

*To all whom it may concern:*

Be it known that I, HENRY BROOME, of the city of Springfield, in the county of Clarke and State of Ohio, have invented certain new and useful Improvements in Joints or Couplings for Stove and other Pipes; and I hereby declare that the following specification is a full, clear, and concise description of the same, reference being had to the drawings hereto annexed.

My invention relates more particularly to couplings or joints for sheet-metal pipes; and it consists in a peculiar impression or indentation made in both the male and female sections of pipe, by which they are guided into their united position, and by a fractional turn in opposite directions are securely locked together so as to bear the weight of the pipe for a considerable length of time when in a horizontal position.

The construction of the locking parts is such that when the pipe is perpendicular the weight of the added sections thereof tightens them more firmly together.

I am aware that in the present state of the art grooves and studs or nipples are not new, the use of circumferential grooves with a nipple and a right-angled groove or bayonet-lock with a stud entering therein being among those most known; also, curved slots and a stud for locking therewith, as shown in the patent of J. S. Loring, May 23, 1876. These forms of construction do not combine both a self-tightening and a locking joint, as in my device.

Figure 1 is a view of two sections of sheet-metal pipe united, having my improved joint or coupling. Figs. 2 and 3 are the same separated. Fig. 4 shows two united sections of a smoke-stack pipe standing vertically. Figs. 5 and 6 are broken sections of the joint end of the male and female parts of the pipe.

A is the pipe; $a$, the male, and $b$ the female, sections. Each is provided with a bead at the inner end of the joint, and one telescopes within the other, the same as in ordinary stove-pipe joints.

The male section $a$ is provided with grooves $a'$, impressed or indented in it from the outside. There are four of these grooves generally made in ordinary pipe-joints, though the number can be varied to suit the size and weight of the pipe. They extend from the outer end of the joint to about two-thirds its length. The groove is straight in line with the pipe nearly half its length. It then diverges to one side at an angle of about sixty degrees, more or less, from the perpendicular or straight groove, that part which is inclined forming the locking part.

The female section $b$ of the joint has a raised teat, $b'$, formed on the inside by impression from the outside, about one-third the length of the joint from its outer end. These teats or nipples correspond in location and number with the grooves $a'$, and when the two sections are united they pass up the grooves to the angle $c$ as the pieces are slipped together, and by giving either or both sections of the pipe a partial rotation (the male section $a$ to the right and the female section $b$ to the left) the nipples $b'$ are forced up the inclined part of the groove, locking the two sections of pipe firmly together.

Unlike the bayonet-lock, the groove $b'$, from the angle $c$ to its extreme inner end, inclines upward toward the bead $d$, so that the sections do not become loosened apart, as they might were this part of the groove extended around the pipe, cutting its axial line at right angles, as in the ordinary bayonet-joint. The groove in the latter is cut through the metal instead of being impressed in it.

I claim as my improvement—

The combination of the part $a$, provided with a series of grooves, $a'$, with the part $b$, provided with a series of nipples, $b'$, whereby the joint is made self-tightening as well as locked when said sections are joined together and the nipples $b'$ on section $b$ shall have passed into the grooves $a'$ beyond the angles $c$, as set forth.

HENRY BROOME.

Attest:
   B. C. CONVERSE,
   THOS. FINCH.